G. WOOD.
SYSTEM OF TELEGRAPHY.
APPLICATION FILED APR. 29, 1909.

1,064,805.

Patented June 17, 1913.

WITNESSES:
R. E. Hamilton

INVENTOR:
George Wood,
BY F. G. Fischer
ATTORNEY

G. WOOD.
SYSTEM OF TELEGRAPHY.
APPLICATION FILED APR. 29, 1909.

1,064,805.

Patented June 17, 1913.
7 SHEETS—SHEET 5.

WITNESSES:
R. Hamilton
M. Cox

INVENTOR.
George Wood,
BY F. G. Fischer,
ATTORNEY.

UNITED STATES PATENT OFFICE.

GEORGE WOOD, OF KANSAS CITY, MISSOURI, ASSIGNOR TO DEAN RAPID TELEGRAPH CO., A CORPORATION OF ARIZONA.

SYSTEM OF TELEGRAPHY.

1,064,805. Specification of Letters Patent. Patented June 17, 1913.

Application filed April 29, 1909. Serial No. 493,020.

*To all whom it may concern:*

Be it known that I, GEORGE WOOD, a citizen of the United States, residing at Kansas City, in the county of Jackson and State of Missouri, have invented certain new and useful Improvements in Systems of Telegraphy, of which the following is a specification.

My invention relates to a system of telegraphy, and embraces a receiver adapted to print messages in page form, a stylus forming part of said receiver and adapted to print the code which I employ, and a transmitter for sending impulses to the receiver.

The stylus passes to and fro across the paper on which the message is printed, and said paper is advanced by feeding mechanism one step after the printing of each line, so that the message is printed upon the paper in page form. The movements of the stylus and the paper feeding mechanism are so timed that the latter remains inactive while the former is printing each line of the message. The stylus embraces two character-bearing levers controlled by two electromagnets energized by a local printing circuit controlled by a polarized relay, adapted to close one branch of said circuit when the incoming current causes its tongue to move in one direction and to close the other branch of said circuit when the tongue is moved in a reverse direction.

The polarized relay is actuated by positive and negative impulses received over a line wire from the transmitter. Said transmitter embodies two contact arms, one of which is in circuit with a battery for sending positive impulses to the polarized relay, and the other is in circuit with a battery for sending negative impulses to said relay.

The contact arms are moved, one at a time, into engagement with adjacent terminals of the line wire by embossed tape traveling beneath said arms, and as each of the latter engages a terminal, a corresponding impulse is transmitted to the polarized relay.

In the accompanying drawings, which illustrate the invention.

In constructing the receiver, I employ a frame comprising a base 1, sides 2 mounted upon said base, and a pair of rails 3, uniting the upper ends of the sides.

4 designates a pair of brackets projecting forwardly from the sides 2 to receive a shaft 5, carrying a pair of disks 6, upon which a paper-roll 7, to receive the messages, is mounted. The free end of the paper is run through a pair of guide-rods 8, thence over a platen 9, and between a pair of feed-rollers 10. The lowermost feed-roller is journaled in the sides 2 of the frame, and the uppermost roller is journaled in a pair of bearings 11, pivotally secured to the sides 2 by screws 12, and provided with a pair of coil springs 13 attached at their lower ends to a pair of pins 14 for the purpose of drawing the uppermost roller down upon the paper, so that it will not slip when feeding said paper forwardly step by step. Platen 9 is secured at its ends to a pair of blocks 15, and guide-rods 8 are carried by a pair of brackets 16 projecting forwardly from the platen.

Figures 8, 9, 10, 11, 12:
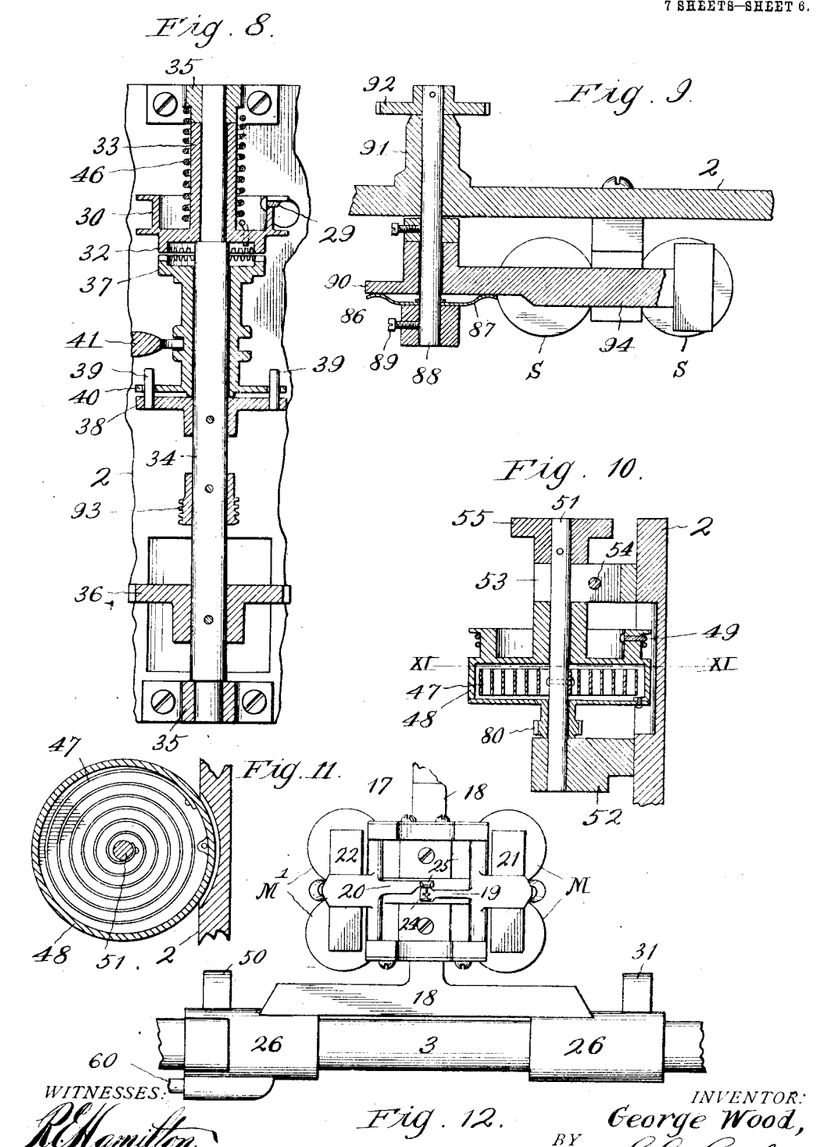
Fig. 8 is a broken vertical section on line VIII—VIII of Fig. 3.
Fig. 9 is an irregular section on line IX—IX of Fig. 5.
Fig. 10 is a vertical section on line X—X of Fig. 6.
Fig. 11 is a horizontal section on line XI—XI of Fig. 10.
Fig. 12 is an inverted plan view of the stylus.

17 designates the stylus, which is reciprocably mounted upon the rails 3 to travel back and forth across the paper upon which the messages are printed. Said stylus comprises a carriage 18, two pairs of oppositely-disposed magnets M and M' secured to the upper portion of said carriage, and a pair of character-bearing levers 19 and 20, pivotally mounted in the lower end of the carriage and provided with armatures 21 and 22, adapted to be attracted, respectively, by the magnets M and M'. The approach of the armatures to their respective magnets is limited by screws 23 adjustably engaging the lower portions of carriage 18. Lever 19 is provided at its free end with a character 24 adapted to print certain letters of the code, and lever 20 is provided at its free end with a character 25 adapted to coöperate with character 24 in printing the remainder of the letters of the code. Carriage 18 is provided with a pair of sleeves 26 which are slidably mounted and swiveled on the rearmost rail 3, to allow said carriage to be swung back to the inoperative position shown in Fig. 12, so that access may be had to the underside of the stylus for the purpose of repairing the same or cleaning the characters. The carriage is retained in an operative position by a clip 27 loosely engaging the front rail and secured to the front portion of the carriage by a screw 28.

The carriage is drawn across the paper from left to right by a cable 29 and a drum 30, the cable being detachably connected at one end to the drum, and at its opposite end to a hook 31 projecting forwardly from one of the sleeves 26. Drum 30 is provided at its underside with a toothed clutch-member 32, and at its upper side with an elongated hub 33, which is loosely-mounted upon a vertical drive-shaft 34, journaled at its ends in two bearings 35, secured to the outer surface of the right side 2. Shaft 34 is constantly driven when the receiver is in operation, by a fixed cog-wheel 36 adapted to be geared to and driven by a suitable motor, 36'. Said shaft is also provided with a loosely-mounted toothed clutch-member 37 adapted to slide vertically thereon, but caused to rotate therewith by a member 38 fixed to the shaft and provided with a pair of diametrically-opposed pins 39, paralleling the shaft and loosely-extending through a cross-arm 40 projecting from the lower end of the clutch-member 37.

Figure 1:
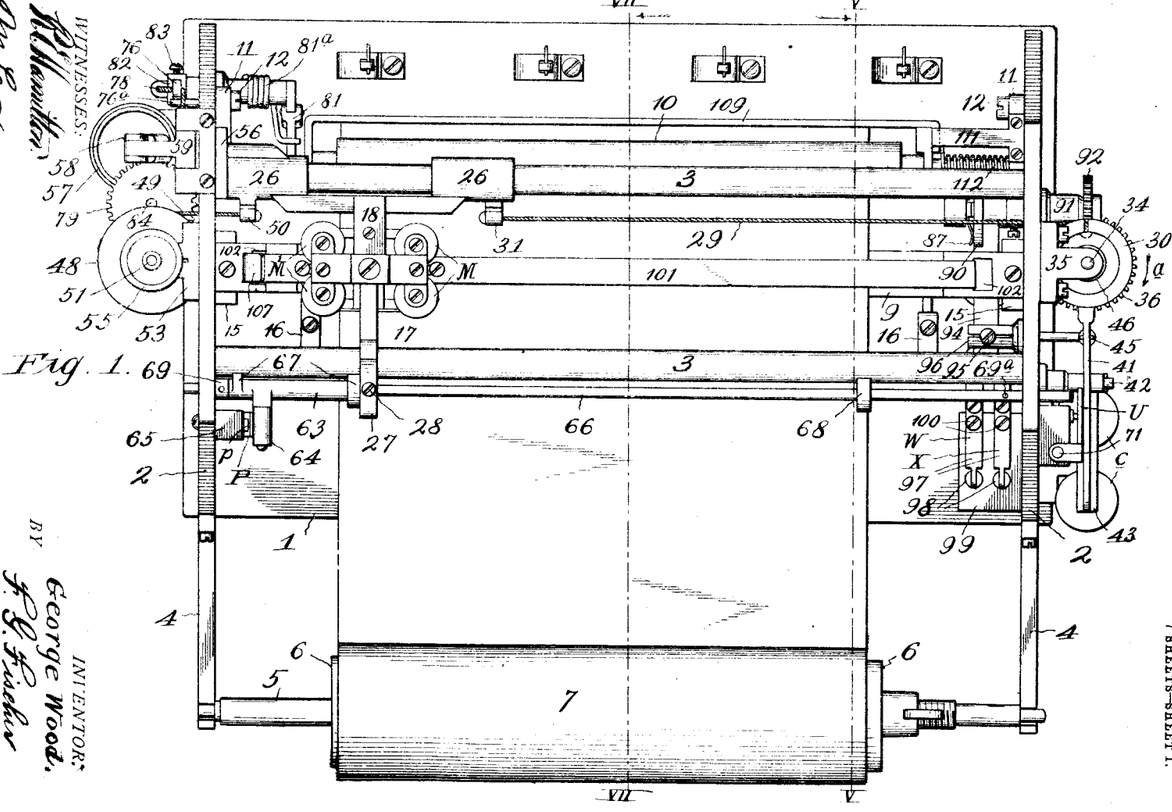
Figure 1 shows a plan view of the receiver.

Clutch-member 37 is thrown into engagement with clutch-member 32 to rotate the drum in the direction of arrow a, Fig. 1, by means of a lever 41 fulcrumed upon a pin 42, and provided at its free end with an armature 43 attracted at proper intervals by an electromagnet c, consisting of two coils secured to a bracket 44, projecting from the adjacent side 2 of the frame. When the electromagnet c is deënergized, lever 41 is drawn to an inoperative position by a retractile spring 45, and throws clutch-member 37 out of engagement with clutch-member 32; so that the stylus may be immediately drawn back to its normal position at the left side of the machine.

In moving backward to its normal position, the stylus, through the instrumentality of the cable 29 and drum 30, winds a coil spring 46 attached at its ends to said drum and the uppermost bearing 35, to constantly retain the cable 29 taut while the stylus is moving back and forth over the paper. As the stylus does not print upon the paper when returning to its normal position, it is desirable to make the return movement much more rapidly than the movement to the right, so I accomplish the return movement through the intermediacy of a heavy spiral spring 47, a drum 48, and a cable 49, which latter is detachably connected at its ends to the drum and a hook 50 projecting from one of the sleeves 26. Drum 48 is loosely-mounted upon a vertical stationary shaft 51, while the spiral spring 47 is secured at its ends to said drum and the shaft 51. Shaft 51 is mounted in bearings 52 and 53, projecting from the left side of the machine, and bearing 53 is split and provided with a tightening screw 54 whereby it is made to grip shaft 51 and hold the same stationary. Shaft 51 is provided at its upper end with a knob 55 so that it may be turned, when screw 54 is loosened, to tension the spring 47.

In order to absorb the shock incident to the rapid return of the stylus, I provide the left side 2 with a cushion 56 for the adjacent sleeve 26 to impinge against. I also provide a dash-pot 57 containing a plunger 58, pivotally connected at its upper end to a bell-crank lever 59, the lower terminal of which is arranged in the path of a pin 60, projecting from the left sleeve 26, and adapted to pass through an opening 61 in the cushion and the adjacent side of the machine to strike lever 59. When pin 60 impinges against the bell-crank lever, it causes the same to lift plunger 58 against the resistance of a liquid 62 in the dash-pot, and thereby retards the motion of the stylus before its sleeve 26 impinges against the cushion 56.

When the stylus returns to its normal position, the upper portion thereof contacts with a sleeve 63 provided with an arm 64, which impinges against a self-opening starting switch P, and pushes the same against its contact-point p, carried by a block of insulation 65 secured to the left side of the machine. Sleeve 63 is loosely-mounted upon a push-bar 66, but prevented from turning thereon by lugs 67 slidably engaging the front rail 3. Push-bar 66 is slidably-mounted in the sides 2 of the frame, but prevented from turning therein by a lug 68, frictionally engaging the front rail 3. The longitudinal movement of push-bar 66 is limited by a collar 69, fixed thereto and interposed between the sleeve 63 and the adjacent side of the frame, and a pin 69ª, extending through its opposite end. Lug 68 is arranged in the path of the upper portion of the stylus, so that should the same strike said lug, it will force it, together with the push-bar, to the right and cause said push-bar to open a safety-switch U, which will interrupt the circuit to magnet c, so that the spring 45 may act on lever 41 and cause it to disengage the clutch-member 37 from clutch member 32, and allow spring 47 to return the stylus to its normal position before said stylus moves too far to the right and injures the machine. Ordinarily the circuit to magnet c will be interrupted so that the stylus may return to its normal position before it engages the lug 68, but I provide the latter, together with the push-bar and the safety-switch U, as a precautionary measure to obviate all danger of the stylus moving abnormally to the right and striking against fixed portions of the receiver. Switch U is normally held closed by a coil spring 70, fixed at its ends to the switch and a stationary pin 71 upon which the switch is pivotally mounted.

As above stated, the stylus does not print upon the paper when returning to its normal position, so advantage of this interval of time is taken to move the paper forward one step to receive another line of the message. The forward movement of the paper is accomplished by spacing mechanism comprising the lowermost feed-roller 10, a ratchet-wheel 72 fixed to said feed-roller, a pawl 73 which engages the ratchet-wheel and turns the same one step at a time, a rocker-arm 74 upon the upper end of which pawl 73 is pivotally mounted, a rocker-shaft 75 mounted in the left side 2 and carrying at its inner end the rocker-arm 74, a rocker-arm 76 fixed to the outer end of shaft 75, a drum 77, a cable 78 attached at its ends to the rocker-arm 76 and the drum 77, a cog-wheel 79 integral with the upper end of drum 77, and a pinion 80, integral with drum 48 to rotate therewith. A pawl 81 prevents the feed-rollers from turning backward with the pawl 73; the free end of which latter is normally held in contact with the ratchet-wheel 72 by a spring 73ª. The free end of pawl 81 is held in engagement with ratchet-wheel 72 by a coil spring 81ª.

From the above description it will be understood that the return movement of the carriage and the spacing of the paper will be controlled from the same source—the spiral spring 47—hence there will be no danger of the spacing mechanism operating when the stylus is moving to the right and printing on the paper.

Slack in cable 78 is taken up by an adjusting device comprising a sleeve 82, to which one end of the cable is attached, said sleeve being adjustably-mounted on arm 76 to which it is fixed after adjustment, by a set-screw 83. Drum 77 is journaled on a stub-shaft 84 extending upward from an arm 85 integral with the bearing 52. The forward movement of pawl 73, when turning the feed-rollers, is limited by the rocker-arm 76 contacting with a stop-pin 76ª projecting from the adjacent side 2 of the frame. When the stylus moves to the right, rocker-arm 74 is carried back with pawl 73, by a coil-spring 74ª, one end of which engages said arm, while its opposite end is secured to shaft 75. Spring 74ª also keeps cable 78 taut when it is unwound from drum 77 by the stylus moving to the right.

86 designates a friction-clutch which breaks the circuit whereby the stylus is drawn to the right. Said clutch comprises a resilient spider 87 fixed to a shaft 88 by a set-screw 89, and a disk 90 loosely-mounted upon said shaft. Shaft 88 is journaled in a bearing 91 on the right side of the frame, and is constantly driven while the machine is in operation by a worm-wheel 92 fixed to the shaft, and a worm 93 which is fixed to the drive-shaft 34. Disk 90 of the friction-clutch is provided with an armature 94 which extends over the poles of an electromagnet S, whereby it is attracted when said magnet is energized, and holds the disk 90 stationary against the action of the constantly rotating spider. When the magnet becomes deënergized, the spider 87 which frictionally engages the disk 90, will turn the same and slowly lift the armature 94 toward the free ends of a pair of circuit-breakers W and X, one of which controls the circuit whereby the stylus is drawn to the right.

Should magnet S become energized before the armature opens the circuit-breakers, the attraction of said magnet will draw the armature down against the resistance of the friction-clutch, but if the magnet remains deënergized until the armature opens the circuit-breakers, the circuit controlling the stylus will be interrupted so that said stylus may be instantly drawn back to its normal position. The upward movement of armature 94 is limited by a set-screw 95 adjustably-engaging a split lug 96 projecting inward from the adjacent side 2. Circuit-breakers W and X comprise two levers 97 pivoted to posts 98, and a pair of contact-points w and x, the contact-points and the posts being secured to a block of insulation 99. Levers 97 are provided with screws 100 which may be adjusted toward or away from the contact-points w and x to render the circuit-breakers more or less sensitive.

Figures 2, 13:
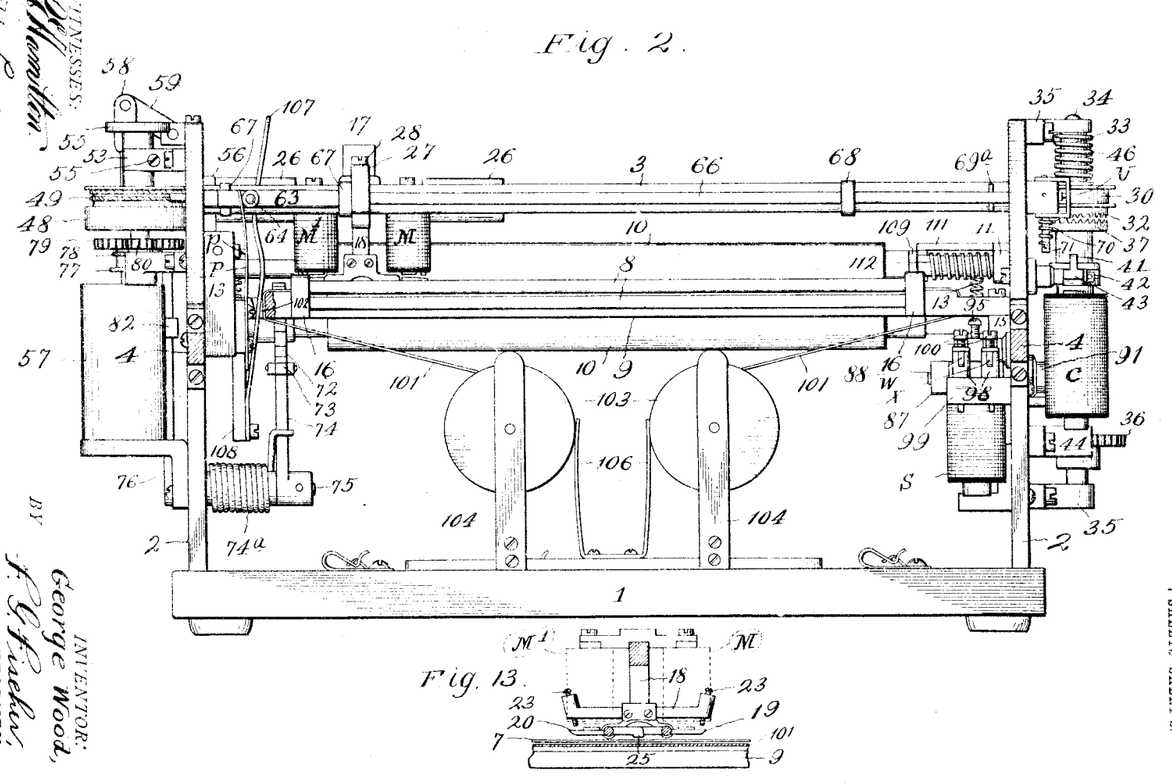
Fig. 2 is a front elevation of the receiver with its brackets for carrying a paper-roll, in cross section.
Fig. 13 is a side elevation of the stylus.

101 designates an ink-ribbon interposed between the stylus and the paper, so that the former may print upon the latter. Ribbon 101 extends over the platen 9, thence downward through two openings 102 in the ends of said platen, and has its ends attached to a pair of spools 103, mounted in bearings 104, and provided with knobs 105 whereby they may be turned to shift the ribbon when necessary. In order to prevent the spools from accidentally turning and allowing the ribbon to become slack, I provide resilient brakes 106, which frictionally engage the peripheries of the spools. The ribbon is also held from moving to the right with the stylus by a resilient clamp 107, Fig. 2, which bears against the ribbon and is secured to an arm 108, depending from the left end of the platen.

Figure 3:
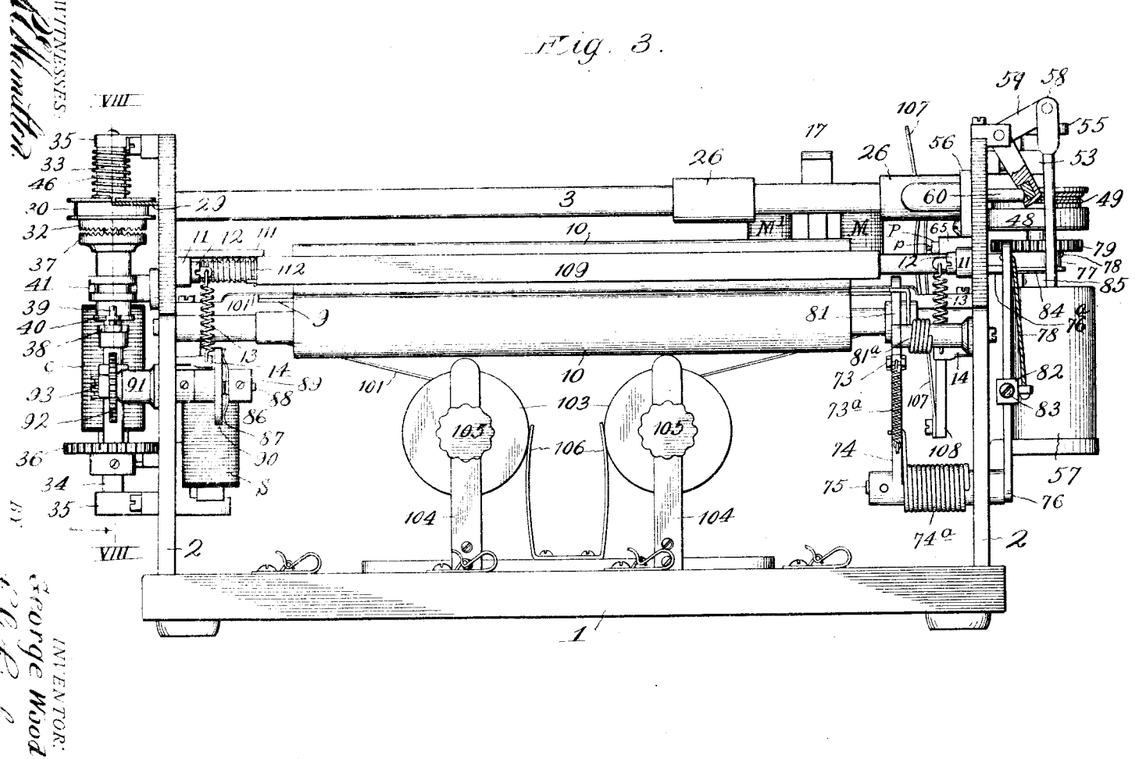
Fig. 3 is a rear elevation of the receiver.
Figure 4:
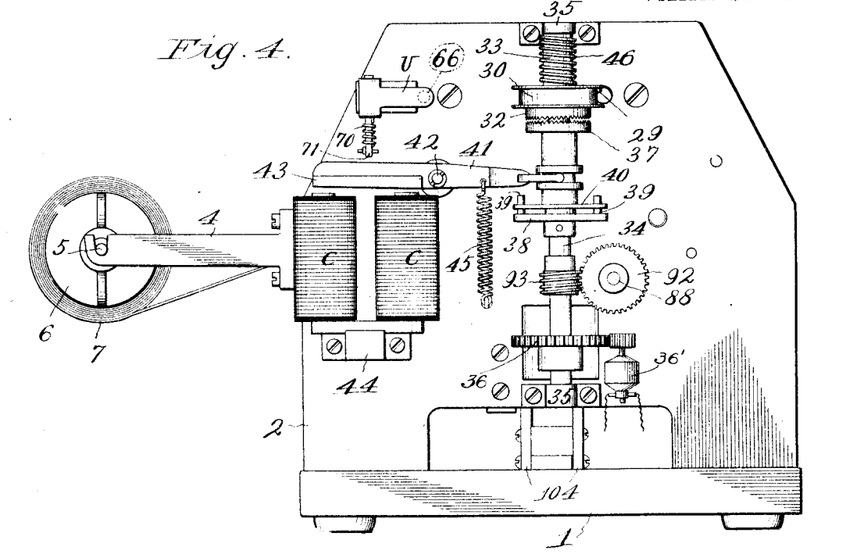
Fig. 4 is an end view of the receiver.
Figure 5:
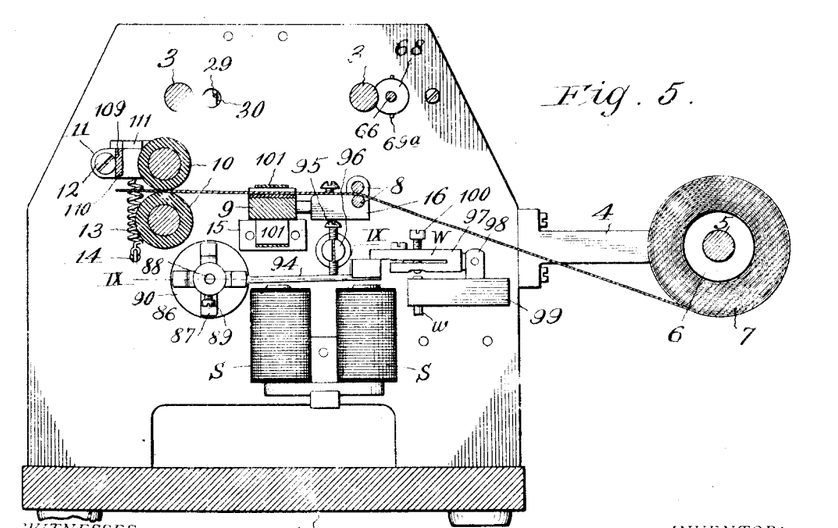
Fig. 5 is a cross section on line V—V of Fig. 1.
Figure 6:
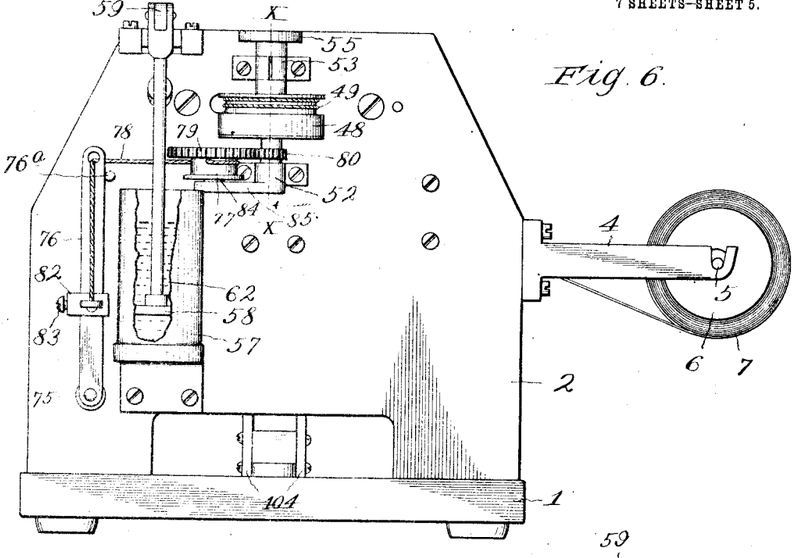
Fig. 6 is an end view of the receiver in a reverse position to that shown in Fig. 4.
Figure 7:
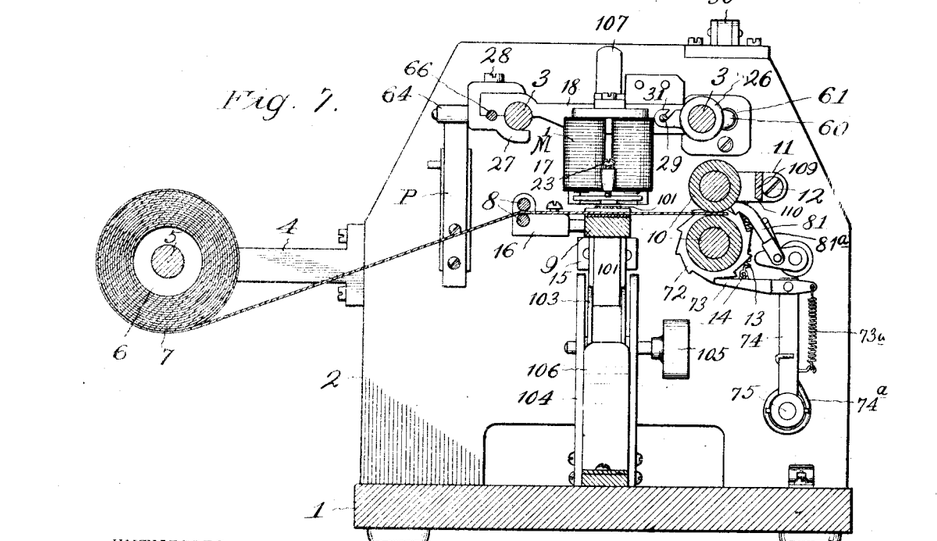
Fig. 7 is a cross section on line VII—VII of Fig. 1.

109 designates a knife whereby the paper is torn into a message sheet after the message has been printed thereon. Said knife is pivotally mounted on the shaft of the uppermost roller 10, so that its cutting-edge 110 may be pressed downward into engagement with the lowermost feed-roller when tearing off the message. When the knife is released it is immediately restored to its normal position against a stop 111 by a coil spring 112, having its ends attached to the knife and the adjacent bearing 11 of the uppermost feed-roller, which bearing also carries stop 111, Figs. 1, 3, and 5.

Figures 14, 15, 16:
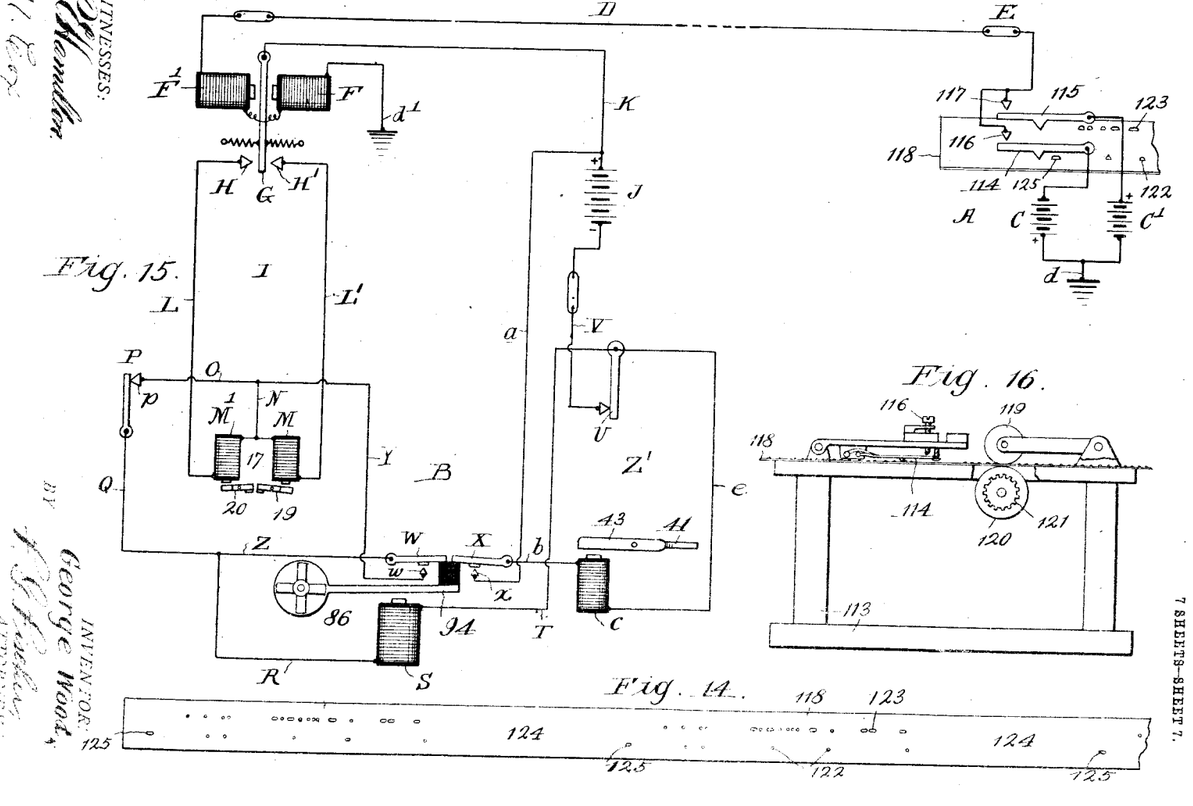
Fig. 14 is a broken detail of a piece of embossed tape employed in conjunction with the transmitter.
Fig. 15 is a diagram showing the transmitter and the receiver electrically connected.
Fig. 16 is a side elevation of the transmitter.

Referring to Figs. 15 and 16, I will proceed to briefly describe the transmitter for sending the impulses to the receiver. Said transmitter consists of a frame 113, and a pair of pivotally-mounted contact arms 114 and 115, which are raised one at a time into engagement with the terminals 116 and 117, respectively, of the line wire D, by the embossed tape 118, which is fed beneath the contact arms by a feed-roller 119 and a feed-roller 120, which latter is driven by a cog-wheel 121, adapted to be geared to a motor, not shown. Tape 118 has two rows of embossments 122 and 123, the former of which is adapted to actuate the contact arm 114, while the latter is adapted to actuate the contact arm 115. Each row of embossments is divided into groups by spaces 124, and each group in row 122 has an initial embossment 125, for a purpose which will hereinafter appear. Each group of embossments, except the initial embossment 125, is equal in length to a line of printed matter on the message-sheet, and the embossments in one group are alternately arranged with the embossments in the opposite group, so that the contact arms will not be simultaneously lifted into engagement with the terminals of the line wire, and thus short-circuit the transmitter instead of sending the impulses to the receiver.

Referring now to the diagram, Fig. 15, which shows the circuits of the transmitter and the receiver, and also the line wire: A designates a transmitting station and B a receiving station. The transmitting station has a local circuit including batteries C and C', of opposite polarity, for transmitting negative and positive impulses, respectively. Each battery communicates with a grounded terminal d of the line wire D. Battery C also communicates with the contact arm 114, while battery C' communicates with the contact arm 115. When the operator at station A desires to transmit a message to the receiving station B, switch E is closed, and the feed-rollers for feeding the strip 118 beneath the contact-arms are set in motion. When the initial embossment 125 passes beneath contact arm 114, and raises the same into engagement with terminal 116, a negative impulse will be transmitted from battery C through the grounded terminal d to the opposite grounded terminal d' of the line wire, thence through the latter to electromagnets F and F' of a polarized relay, and returns to battery C through the line wire D. The negative impulse passing through the polarized relay will draw the vibratory tongue G thereof against a terminal H of a local printing circuit I, containing the stylus, and communicating with a local battery J, which will transmit an impulse of equal duration to the negative impulse, through the receiver and thereby start the stylus on its movement to the right. The printing circuit impulse will traverse a wire K, tongue G, terminal H, a branch wire L, electromagnet M' of the stylus, a wire N, a wire O, the starting-switch P, a wire Q, a wire R, the electromagnet S, a wire T, the safety-switch U, and returns to battery J through a wire V. As the magnet S is energized by the impulse, it will attract armature 94 downward from beneath the circuit-breakers W and X, against the resistance of the friction-clutch 86, and permit said circuit-breakers to engage their respective terminals *w* and *x*. Circuit-breaker W thus maintains the printing circuit in a closed position, whereas it would otherwise be left open by the starting-switch when the stylus moves away from the same. Likewise, circuit-breaker X holds the stylus controlling circuit Z' closed, whereby the movement of the stylus to the right is controlled. As the stylus starts across the paper, it will release the starting-switch P, and thereby interrupt the circuit through wires O and Q. The printing circuit, however, is maintained by the closing of the circuit-breaker W, as above described, and instead of the succeeding impulses passing through wires O and Q, they will pass through wire Y, the circuit-breaker W, and wire Z to wire R. When the current reaches the positive side of battery J, it divides, part flowing through wire K to the printing circuit, and the remainder thereof through the circuit Z', comprising a wire a, circuit-breaker X, a wire b, magnet c, and a wire e, and merges with the printing circuit at the safety-switch U. As the current passes through magnet c it will energize the same and cause said magnet to attract armature 43 downward and thus throw the toothed clutch member 37 into engagement with the toothed clutch member 32 to move the stylus to the right. When embossments in row 123 pass beneath contact arm 115, positive impulses will be transmitted from battery C' through line wire D to the polarized relay, and return to said battery through the grounded terminals d'' and d. The positive impulses will intermittently draw tongue G against the terminal H' of the printing circuit and thereby intermittently close the same, so that impulses of like duration will be transmitted from battery J, over wire K, tongue G, branch wire L', magnet M, and wire N, from which the positive impulses will pursue the same course traversed by the negative impulses. As the magnets M' and M become energized, respectively, by the negative and positive impulses, they will actuate their respective character-bearing arms and thus print the message upon the paper as the stylus moves across the same. When the initial embossment 125 passes from beneath the contact arm 114, the line wire and printing circuits will be momentarily interrupted, but the stylus controlling circuit remains closed, because the armature 94 will not have time to operate the circuit-breakers W and X before another embossment passes beneath one of the contact arms to transmit another impulse. Thus it will be understood that while the magnet S is momentarily deënergized between impulses, magnet c remains energized by the constant current through circuit Z', and the stylus will therefore be steadily drawn to the right until one of the spaces 124, between the groups of embossments, passes beneath the contact arms. When this occurs, the pause between the comparatively rapid succession of impulses is of sufficient duration to allow armature 94 to open the circuit-breakers W and X, and allow the stylus to return to its normal position before the initial embossment of the following group reaches the contact arm 114. By employing this arrangement, it is immaterial whether the stylus and the embossed strip travel at the same speed or not, as the long pause gives the stylus time to return to normal position and be ready to start another line of the message by the time the initial embossment of each group is ready to pass beneath contact arm 114, hence complicated synchronizing mechanism is unnecessary.

The signals transmitted by the initial embossments signify nothing in the message, and are merely employed to allow the stylus to attain normal speed before the message signals are transmitted, hence uniform spacing of the printed characters is insured.

Having thus described my invention, what I claim is:

1. In a system of telegraphy, a printing circuit adapted to be intermittently closed by a succession of impulses, a line wire over which said impulses are transmitted, means for sending said impulses over the line wire, a reciprocably-mounted stylus, a stylus controlling circuit communicating with said printing circuit to control the movement of the stylus in one direction, means for interrupting said stylus controlling circuit during a long pause between impulses, and means for restoring the stylus to normal position during the interruption of its controlling circuit.

2. In a system of telegraphy, a printing circuit adapted to be intermittently closed by a succession of impulses, a line wire over which said impulses are transmitted, means for sending said impulses over the line wire, a reciprocably-mounted stylus, a stylus controlling circuit communicating with said printing circuit to control the movement of the stylus in one direction, automatic means for interrupting said stylus controlling circuit during a long pause between impulses, and means for restoring the stylus to normal position during the interruption of its controlling circuit.

3. In a system of telegraphy, a printing circuit adapted to be intermittently closed by a succession of impulses, a line wire over which said impulses are transmitted, means for sending said impulses over the line wire, a reciprocably-mounted stylus, a stylus controlling circuit communicating with said printing circuit to control the movement of the stylus in one direction, electrically-controlled means for interrupting said stylus controlling circuit during a long pause between impulses, and means for restoring the stylus to normal position during the interruption of its controlling circuit.

4. In a system of telegraphy, a printing circuit adapted to be intermittently closed by a succession of impulses, a line wire over which said impulses are transmitted, means for sending said impulses over the line wire, a reciprocably-mounted stylus, a stylus controlling circuit communicating with said printing circuit to control the movement of the stylus in one direction, mechanism for interrupting said stylus controlling circuit during a long pause between impulses, means controlled by the impulses for holding said mechanism inoperative, and means for restoring the stylus to normal position during the interruption of its controlling circuit.

5. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, a constantly driven clutch-member, a second clutch-member adapted to be actuated by the first clutch-member to interrupt the stylus controlling circuit, an electromagnet energized by the impulses to hold the second clutch-member inoperative, and means for restoring the stylus to normal position during the interruption of its controlling circuit.

6. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, a worm-driven clutch-member, a second clutch-member adapted to be actuated by the first clutch-member to interrupt the stylus controlling circuit, an electromagnet energized by the impulses to hold the second clutch-member inoperative, and means for restoring the stylus to normal position during the interruption of its controlling circuit.

7. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, a starting-switch controlled by the stylus to initially close said stylus controlling circuit, means for holding the stylus controlling circuit closed when said starting-switch opens, means for interrupting said stylus controlling circuit during a long pause between impulses, and means for restoring the stylus to normal position during the interruption of its controlling circuit.

8. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, a self-opening starting-switch controlled by the stylus to initially close said stylus controlling circuit, means for holding the stylus controlling circuit closed when said starting-switch opens, means for interrupting said stylus controlling circuit during a long pause between impulses, and means for restoring the stylus to normal position during the interruption of its controlling circuit.

9. In a system of telegraphy, a printing circuit adapted to be intermittently closed by a succession of impulses, means for transmitting impulses to said printing circuit, a reciprocably mounted stylus, a stylus controlling circuit communicating with said printing circuit to control the movement of the stylus in one direction, a starting switch controlled by the stylus to initially close said stylus controlling circuit, a circuit-breaker for holding the stylus controlling circuit closed when said starting-switch opens, means for opening said circuit-breaker during a long pause between impulses, and means for restoring the stylus to normal position during the interruption of its controlling circuit.

10. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, a starting-switch controlled by the stylus to initially close said stylus controlling circuit, a circuit-breaker for holding the stylus controlling circuit closed when said starting-switch opens, frictionally controlled means for opening said circuit-breaker during a long pause between impulses, and means for restoring the stylus to normal position during the interruption of its controlling circuit.

11. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, means independent of the stylus for interrupting the stylus controlling circuit during a long pause between impulses, and means for restoring the stylus to normal position during the interruption of its controlling circuit.

12. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, means controlled by the stylus for interrupting the stylus controlling circuit during a long pause between impulses, and means for restoring the stylus to normal position during the interruption of its controlling circuit.

13. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, a safety-switch controlled by the stylus for interrupting the stylus controlling circuit during a long pause between impulses, and means for restoring the stylus to normal position during the interruption of its controlling circuit.

14. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, a safety-switch controlled by the stylus for interrupting the stylus controlling circuit during a long pause between impulses, a push-bar between the stylus and the safety-switch whereby the latter opening by said stylus, and means for restoring the stylus to normal position during the interruption of its controlling circuit.

15. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, a self-closing safety-switch controlled by the stylus for interrupting the stylus controlling circuit during a long pause between impulses, and means for restoring the stylus to normal position during the interruption of its controlling circuit.

16. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, a starting-switch to initially close said stylus controlling circuit, means for holding the last-mentioned circuit closed when said starting-switch opens, a safety-switch for interrupting the stylus controlling circuit, and a stylus controlled push-bar for actuating the safety-switch.

17. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, winding mechanism thrown into gear by the last-mentioned circuit to move the stylus in said direction, and means for interrupting the stylus controlling circuit during a long pause between impulses.

18. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, winding mechanism thrown into gear by the last-mentioned circuit to move the stylus in said direction, means for interrupting the stylus controlling circuit during a long pause between impulses, and means for automatically throwing the winding mechanism out of gear when the stylus controlling circuit is interrupted.

19. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, winding mechanism thrown into gear by the last-mentioned circuit to move the stylus in said direction, means for interrupting the stylus controlling circuit during a long pause between impulses, and means for restoring the stylus to normal position during the interruption of its controlling circuit.

20. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, winding mechanism thrown into gear by the last-mentioned circuit to move the stylus in said direction, means for interrupting the stylus controlling circuit during a long pause between impulses, and resilient means for automatically throwing the winding mechanism out of gear when the stylus controlling circuit is interrupted.

21. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, an electromagnet in the last-mentioned circuit, a lever attracted by said electromagnet, a constantly rotating clutch-member controlled by said lever, a drum containing a clutch-member engaged by said constantly rotating clutch-member when the electromagnet is energized, and a cable connecting the stylus and said drum.

22. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, an electromagnet in the last-mentioned circuit, a lever attracted by said electromagnet, a constantly rotating clutch-member controlled by said lever, a drum containing a clutch-member engaged by said constantly rotating clutch-member when the electromagnet is energized, a cable connecting the stylus and said drum, and resilient means having one end stationary and its opposite end secured to the drum to keep the cable taut on said drum.

23. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, means for interrupting said stylus controlling circuit during a long pause between impulses, means for restoring the stylus to normal position during the interruption of its controlling circuit, and cushioning means to obviate shock to the stylus on returning to said normal position.

24. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, means for interrupting said stylus controlling circuit during a long pause between impulses, means for restoring the stylus to normal position during the interruption of its controlling circuit, a dash-pot, and a plunger in said dash-pot, actuated by the stylus on returning to normal position.

25. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, means for interrupting said stylus controlling circuit during a long pause between impulses, and resilient means for restoring the stylus to normal position during the interruption of its controlling circuit.

26. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, means for interrupting said stylus controlling circuit during a long pause between impulses, and mechanism independent of the circuits, to restore the stylus to normal position during the interruption of its controlling circuit.

27. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, means for interrupting said stylus controlling circuit during a long pause between impulses, a drum, a cable attached to the stylus and said drum, and means for rotating the drum to restore the stylus to normal position during the interruption of its controlling circuit.

28. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, means for interrupting said stylus controlling circuit during a long pause between impulses, a drum, a cable attached to the stylus and said drum, and resilient means for rotating the drum to restore the stylus to normal position during the interruption of its controlling circuit.

29. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, means for interrupting said stylus controlling circuit during a long pause between impulses, mechanism to restore the stylus to normal position during the interruption of its controlling circuit, and paper feeding means actuated by said mechanism to feed paper beneath the stylus.

30. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, means for interrupting said stylus controlling circuit during a long pause between impulses, mechanism to restore the stylus to normal position during the interruption of its controlling circuit, paper feeding means actuated by said mechanism to feed paper beneath the stylus, and a knife carried by said paper feeding means.

31. In a system of telegraphy, a printing circuit adapted to be intermittently closed by a succession of impulses, means for transmitting impulses to said printing circuit, a reciprocably-mounted stylus, a stylus controlling circuit communicating with said printing circuit to control the movement of the stylus in one direction, means for interrupting said stylus controlling circuit during a long pause between impulses, mechanism to restore the stylus to normal position during the interruption of its controlling circuit, paper feeding means actuated by said mechanism to feed paper beneath the stylus, a knife carried by said paper feeding means, an ink-ribbon between the paper and the stylus, and a platen adjacent said ink-ribbon.

32. In a system of telegraphy, a printing circuit adapted to be intermittently closed by a succession of impulses, means for transmitting impulses to said printing circuit, a reciprocably-mounted stylus, means for moving the stylus in one direction during the continuance of said impulses, and means for restoring the stylus to normal position during a comparatively long cessation of impulses.

33. In a system of telegraphy, a printing circuit adapted to be intermittently closed by a succession of impulses, means for transmitting impulses to said printing circuit, a reciprocably-mounted stylus, means for moving the stylus in one direction during the continuance of said impulses, and automatic means for restoring the stylus to normal position during a comparatively long cessation of impulses.

34. In a system of telegraphy, a printing circuit adapted to be intermittently closed by a succession of impulses, means for transmitting impulses to said printing circuit, a reciprocably-mounted stylus, means for moving the stylus in one direction during the continuance of said impulses, and mechanism independent of the circuits, to restore the stylus to normal position during the interruption of its controlling circuit.

35. In a system of telegraphy, a printing circuit adapted to be intermittently closed by a succession of impulses, means for transmitting impulses to said printing circuit, a reciprocably-mounted stylus, automatic means for moving the stylus in one direction during the continuance of said impulses, and means for restoring the stylus to normal position during a comparatively long cessation of impulses.

36. In a system of telegraphy, a reciprocably-mounted stylus, means for transmitting impulses thereto, mechanism for moving said stylus in one direction, a circuit for controlling said mechanism, and means for restoring the stylus to normal position when the circuit is interrupted, energy being increased within said means by the stylus when moving from its normal position.

37. In a system of telegraphy, a reciprocably-mounted stylus, means for transmitting impulses thereto, mechanism for moving said stylus in one direction, a circuit for controlling said mechanism, a friction-clutch for interrupting said circuit, and means for restoring the stylus to normal position when the circuit is interrupted.

38. In a system of telegraphy, a pair of rails, and a stylus reciprocably-mounted thereon, said stylus also being swiveled upon one of said rails so that access may be had to its characters.

39. In a system of telegraphy, a reciprocably-mounted stylus, means for moving said stylus in one direction, means for restoring the stylus to normal position, a drum geared to said restoring means, a rocker-arm actuated by said drum, ratchet-mechanism actuated by said rocker-arm, and feed-rollers actuated by said ratchet-mechanism, to feed paper beneath the stylus.

40. In a system of the character described, a printing circuit, a reciprocably-mounted stylus, a stylus controlling circuit communicating with said printing circuit for controlling the movement of the stylus in one direction, a transmitter for controlling the printing circuit, a sheet or tape containing elements for controlling said transmitter, said elements being interrupted at intervals by comparatively long spaces whereby the transmitter is permitted to pause and interrupt the printing circuit for comparatively long periods of time, means for interrupting the stylus controlling circuit during said long periods of time, and means for returning the stylus to its normal position during the interruption of its controlling circuit.

In testimony whereof I affix my signature, in the presence of two witnesses.

GEORGE WOOD.

Witnesses:
F. G. FISCHER,
M. COX.